Sept. 18, 1962   J. V. ATANASOFF   3,054,472
SOUND DISCRIMINATING DEVICE
Filed Jan. 31, 1955   2 Sheets-Sheet 1
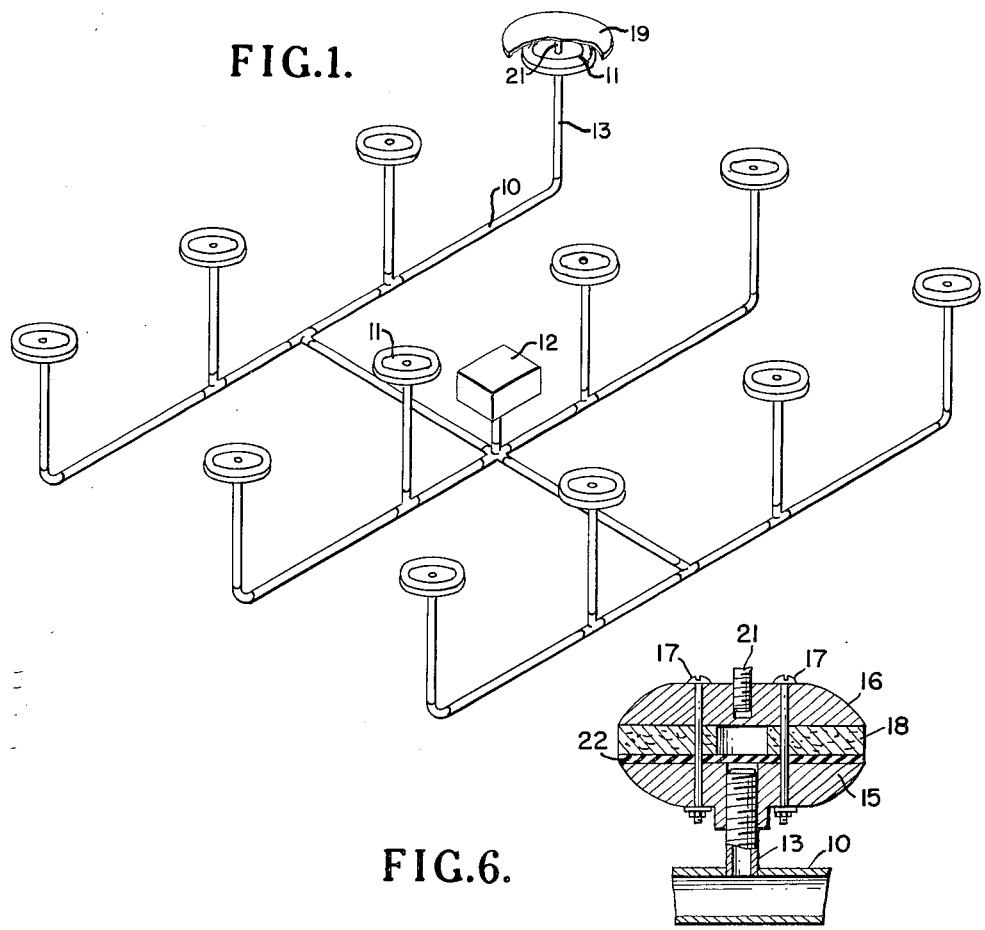
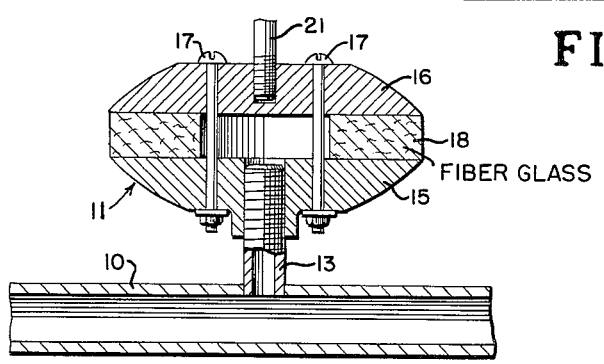
INVENTOR
J. V. ATANASOFF
BY
ATTORNEYS

INVENTOR
J. V. ATANASOFF

United States Patent Office 3,054,472
Patented Sept. 18, 1962

3,054,472
SOUND DISCRIMINATING DEVICE
John V. Atanasoff, P.O. Box 466, Rockville, Md.
Filed Jan. 31, 1955, Ser. No. 485,356
10 Claims. (Cl. 181—.5)
(Granted under Title 35, U.S. Code (1952), sec. 266)

The invention described herein may be manufactured and used by or for the Government of the United States of America for governmental purposes without the payment of any royalties thereon or therefor.

The present invention relates to the method and apparatus for receiving acoustical signals. More particularly the invention encompasses the method of manipulating the signals in relation to the accompanying acoustical disturbances such that the disturbances tend to be eliminated and an apparatus for receiving an acoustical signal in the presence of acoustical disturbances.

The prior art has employed a number of methods to distinguish between desired acoustical signals and unwanted acoustical disturbances. Some of the prior art devices attempt to distinguish signal and disturbance on the basis of frequency differences. Other devices are sensitive to the direction of propagation. In other devices the detection of the signal is based on the detailed structure of the signal as distinguished from the structure of the disturbance. Still other devices are based on the polarization or mode of vibration of the signal. These prior art devices usually consist of some acoustic structure such as a horn or resonant pipe, which terminates in an electrical transducer. The transducer converts the mechanical wave motion of the acoustic signal into an electrical signal which is proportional to the acoustic pressure, velocity, or some other parameter of the desired acoustic signal.

None of these prior art devices is capable of receiving and detecting an unpolarized signal having a frequency comparable to the frequency of the accompanying acoustical disturbances.

It is an object of the present invention to provide a method of manipulating an acoustical signal and accompanying disturbances to eliminate the effect of the disturbances while receiving the signal.

Another object of the present invention is to provide an apparatus for receiving an acoustical signal while eliminating the effects of acoustical disturbances.

Another object of the present invention is to provide an acoustical system in which the desired signal is coherent within said system and in which the acoustical disturbance is incoherent within the system.

A further object of the invention is to provide an acoustical system having a resistive coupling between the system and the surrounding acoustical transmitting medium.

A further object of this invention is to provide a resistance coupling for coupling an acoustical system to the surrounding acoustical transmitting medium.

A further object of this invention is to provide an acoustical system which is coherently responsive to laminar acoustical disturbances but incoherently responsive to vortical acoustical disturbances.

Other objects and many of the attendant advantages of this invention will be readily appreciated as the same becomes better understood by reference to the following detailed description when considered in connection with the accompanying drawings wherein:

FIG. 1 is an elementary nondirectional array form of the system of this invention;

FIG. 6 is a cross sectional view of one of the terminations for the opening or coupling means for the systems of this invention; and FIG. 7 is a modification of the termination illustrated in FIG. 6.

Figure 2:
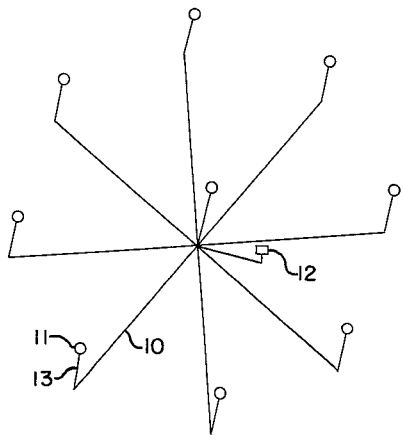
FIG. 2 is a diagram of a modified nondirectional array form of the invention.

The present invention is related to those prior art devices which distinguish desired signals from unwanted acoustical disturbances on the basis of polarization or mode of vibration, and is particularly adapted to function in fluid acoustical transmission media. In such media, it is generally accepted as a fact that only one mode of transmission exists as far as real acoustic vibrations are concerned. However, in a slightly broader sense, as related to the present invention, there is a second or quasi mode of disturbance which affects the reception of the desired signal. The mode of transmission of the real acoustic vibration is characterized by a laminar wave structure, whereas, the structure of the quasi mode of transmission is that of a solenoidal vortex and includes turbulence. Also the real acoustic vibration is transmitted with the velocity of sound through the particular medium, but the disturbance having the quasi mode of transmission is propagated with the velocity of the flow of the medium past a stationary point, the receiving system.

It has been observed that a vortical disturbance is almost invariably not a signal, but is noise. In many cases vortical disturbances constitute the largest portion of the noise present so that the signal-to-noise ratio is greatly increased by eliminating the solenoidal component.

It is assumed for the purposes which this invention is to be used that the velocity of propagation of the desired signal is much greater than the velocity of motion of the vortical disturbance in the acoustical transmitting medium. In general this condition exists in natural fluid media. For example, the velocity of sound in the particular fluid medium of air is of the order of 1100 feet per second as compared with 40 to 20 feet per second for the usual velocity of moving air masses with the vortical disturbances in them. Even larger differences in velocity would naturally exist in a fluid medium such as water. Consequently, for a given frequency, the wave length of the signal is much larger than that of the disturbance.

In view of this argument it is possible to construct a receiving system having an over-all dimension of the order of one-fourth the shortest wave length of the frequency band it is desired to receive but which is large compared with the length of the disturbance within this band. Such a system, embodying the present invention, will discriminate between the desired signal and the disturbance inasmuch as the increments to the signal within the system, transmitted through the array of terminations will be substantially in phase, that is they will be coherent, and therefore additive; while the increments to the disturbance within the system will be of random phase, that is they will be incoherent and will tend to cancel each other. In such a system the increase in the signal to noise ratio can be improved by a factor of the square root of the number of openings by providing the system with resistance couplings at each of the terminations.

A more generalized approach to the present invention does away with the requirement that the length of the system be limited to one-fourth the shortest wave length it is desired to receive. This more generalized approach establishes a system in which there is set up in an acoustically isolated medium a wave motion which matches the wave motion in the acoustical medium surrounding the system. This is accomplished by providing the plurality of acoustical terminations in the system, for coupling the system to the surrounding medium, with the proper values of acoustical resistance.

In order to permit a relatively simple mathematical treatment of this case by the methods of ordinary calculus and partial differential equations, it is assumed that the conductance is distributed along the conduit. Although the distributed case is easier to treat mathematically, either approach can be used in the actual construction of systems for the purposes indicated herein. As is well known from mathematical theory and from experience with similar factors in the analogous electrical systems, the difference in performance will be small if the concentrated conductances are sufficiently numerous and if the average conductance is unchanged.

In the subsequent discussion the following symbols and definitions will be employed:

$x$ = distance along system
$t$ = time
$\sigma$ = conductance per unit length between the system and the external medium in volumetric units
$\Sigma$ = lumped conductance
$\rho$ = density of medium
$A$ = cross section of the system
$$\eta = \frac{\rho \sigma}{A}$$
$$N = \frac{\rho \Sigma}{A}$$
$\omega = 2\pi$ times the frequency
$\theta$ = angle between the length of the system and the direction of the incident sound
$c$ = velocity of sound in external medium
$k = \frac{\omega \cos \theta}{c}$ = component of the propagation constant in the direct of the system
$P$ = pressure outside the system
$p$ = pressure inside the system
$v$ = particle velocity in the sound wave
$V$ = wave velocity in the system
$R = \frac{2}{V\eta}$ = averaging radius
$\lambda$ = wave length
$K = \frac{1}{V^2} = \frac{\partial \rho}{\partial p}$ = the compressibility
$i = \sqrt{-1}$
$$\gamma = \frac{i\omega\eta}{k^2 - K\omega^2 + i\omega\eta}$$
$$\delta = \sqrt{K\omega^2 - i\omega\eta}$$

For the case where the system comprises a pipe with openings spaced along the pipe such that the number of openings is sufficiently large to take full advantage of the averaging effect for turbulences of the smallest diameter it is desired to eliminate, the equation of continuity is:

$$\frac{\partial \rho}{\partial t} + \frac{\partial (\rho v)}{\partial x} = \eta(P-p) \quad (1)$$

Likewise, the equation of motion is $$-\frac{\partial p}{\partial x} = \rho \frac{dv}{dt} \quad (2)$$

Expanding the two equations above yields $$K\frac{\partial p}{\partial t} + \rho \frac{\partial v}{\partial x} + v\frac{\partial \rho}{\partial x} = \eta(P-p)$$

and $$\rho\frac{\partial v}{\partial t} + \rho v \frac{\partial v}{\partial x} = -\frac{\partial p}{\partial x}$$

When we omit the terms of higher order $$v\frac{\partial \rho}{\partial x}, v\frac{\partial v}{\partial x}$$

differentiate the first equation above by $t$ and the second equation above by $x$, and combine, we have $$K\frac{\partial^2 p}{\partial t^2} + \eta \frac{\partial p}{\partial t} - \frac{\partial^2 p}{\partial x^2}\eta = \frac{\partial p}{\partial t} \quad (3)$$

We seek the solution of Equation 3 for the case where a plane wave impinges upon the system; i.e., we have in the surrounding medium adjacent to the pipe $$P = e^{i(\omega t - kx)} \quad (4)$$

A particular integral of Equation 3 is $$p = \gamma e^{i(\omega t - kx)} \quad (5)$$

where $\gamma$ is a constant of integration and is given, upon substitution of (5) into (3), as $$\gamma = \frac{i\omega\eta}{k^2 - K\omega^2 + i\omega\eta} \quad (6)$$

With any homogeneous boundary conditions not involving the time explicitly, a complementary function is obtained by adjusting $$p_2 = e^{i(\omega t - \delta x)} \quad (7)$$

to satisfy $$K\frac{\partial^2 p}{\partial t^2} + \eta \frac{\partial p}{\partial t} - \frac{\partial^2 p}{\partial x^2} = 0 \quad (8)$$

We have $$-K\omega^2 + i\omega\eta + \delta^2 = 0 \quad (9)$$

hence $$\delta = \sqrt{K\omega^2 - i\omega\pi}$$

We note that the imaginary part of $\delta$ yields an exponential decrease (increase) of signal with distance. In fact, we may put $$\frac{I}{R} = \text{Imaginary part of } \delta \quad (10)$$

where R is the averaging radius of the system for the frequency $\omega/2\pi$.

Since $$K = \frac{1}{V^2}$$

we find $$\delta = \sqrt{\frac{\omega^2}{v^2} - i\omega\eta} = \frac{\omega}{v}\sqrt{1 - i\frac{\omega^2\eta}{\omega}}$$

If the second term under the radical is sufficiently small, we have $$\delta \approx \frac{\omega}{v}\left(1 - i\frac{v^2\eta}{2\omega}\right) = \frac{\omega}{v} - i\frac{v\eta}{2}$$

In most cases this approximation is sufficient. Hence in this case $$R = \frac{2}{V\eta} \quad (11)$$

The solution of Equation 3 can now be written as a combination of (5) and (7); i.e., $$p = \gamma e^{i(\omega t - kx)} + \epsilon e^{i(\omega t - \delta x)} \quad (12)$$

$\epsilon$ is to be determined by boundary conditions.

The meaning of R is as follows: Any disturbance which is introduced at a single point in the pipe tends to decrease exponentially and at the distance R from its initial point its value is reduced by a factor $1/e$. The second term of (12) is such a disturbance. The first term is the portion of the signal which is introduced into the pipe by the external wave during its passage along the pipe.

In case of the turbulence, a solution is obtained in a similar manner. In this case, however, the external field (right-hand side of (3)) is coherent only over the dimension of an individual turbulence. As discussed earlier, this distance is small compared with the dimensions of the system. Thus a turbulent impulse can be assumed to be a simple point driving force. As a result, for turbulence we have only the second term of Equation 12. The total internal turbulence field is then the sum of all these incremental fields from individual impulses. Inasmuch as the phases of these fields are randomly distributed, the sum vanishes. That is to say, the incoherent disturbances tend to cancel. From this discussion a further meaning of R may be deduced. Thus we conclude that only those terminations within a distance of the order of R contribute to the averaging process which tends to eliminate noncoherent disturbances from the system.

We now suppose the pipe to extend from $x=0$ towards $x=\infty$. The end at $x=0$ may be open or closed but more generally we assume it to be fitted with a concentrated conductance $\Sigma$. If $\Sigma=0$, the end is closed; if $\Sigma=\infty$, it is open. Further let $$N = \frac{\rho \Sigma}{A}$$

Then at $x=0$ $$\rho v = N(P-p)$$

Hence at $x=0$ $$-\frac{\partial \rho}{\partial x} = N\frac{d}{dt}(P-p) \simeq N\frac{\partial}{\partial t}(P-p) \quad (13)$$

in which the approximation in the last term is standard in wave theory.

Substitution of (4) and (12) into (13) leads to an expression for $\epsilon$; i.e., $$\epsilon = \frac{N\omega(1-\gamma) - \gamma k}{N\omega + \delta} \quad (14)$$

If the pipe is open $\epsilon = 1-\gamma$; if closed $$\epsilon = \frac{\gamma k}{\delta}$$

We are now in position to infer a preferred design for a turbulence-eliminating system designed according to present specifications.

Although in the theory just presented, the pipe is regarded as extending from $x=0$ to $x=\infty$, an infinite pipe is by no means necessary to secure the advantages of the present method. The pipe of FIGURE 3, which extends from $x=-L/2$ to $x=+L/2$ and which has the transducer 12 coupled at the center, i.e., at $x=0$, suffices to yield extremely satisfactory performance. Crudely spoken, those terminations which enter into the averaging process at the transducer are those within an averaging radius of R from the transducer. We note that the terminations in both directions from the detector enter into the averaging process. As a consequence of this, the number of terminations entering the averaging process is increased.

It is possible to design an array with capacitative (elastic) coupling or inductive (inertive) coupling between the inside of the tube and the outside, but it should be obvious that this will result in a system which has higher reactive terms and hence is not as flat with respect to frequency. In all cases critically examined the conductive coupling was found to be preferred.

However the addition of some reactive components may be of value in certain cases according to well known transmission line theory; the use of such components is not excluded in the present discussion. Furthermore the use of resistive and/or reactive components in series is not excluded.

It is generally desirable to have the pipe nearly open at the ends, that is to have the conductance $\Sigma$ as large as possible. The upper limit of this condition arises when the impulses produced by turbulence at the end on the transducer become larger than those produced by turbulences at other points on the transducer thus preventing good averaging.

Figure 4:
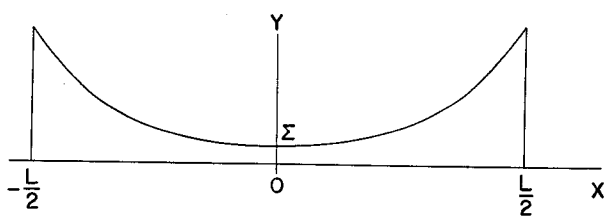
FIG. 4 is a graph showing the distribution of conductance along the length of the system.

An obvious modification is to allow the conductance to vary along the length of pipe as illustrated in the graph of FIGURE 4 where $x$ is length and $y$ is conductance. The higher values of conductance near the ends tend to decrease the disturbance produced by a relatively open end. The conductance near the center of the tube must be sufficient to maintain a wave of suitable amplitude and phase under the precise conditions under which the system is used. Systems with conductances varying by a factor of 6 from the center to the end of the tubes have given good results in practice. The exact mathematical determination of the way that the conductance should vary with position along the tube would require a complete solution of a problem in the calculus of variations but, fortunately, the effects desired are not sensitive to the exact variation if the considerations given here are observed. As a first approximation, one might assume that the conductance should increase exponentially $$\left(\text{as } e^{\frac{x}{R}}\right)$$

from the center in both directions in order that a turbulence of given characteristics would produce the same effect at the center, no matter where it is located. We must remember, however, that the change in conductance will affect the coefficients and exponent, so that in effect the coefficient of $x$ in the exponential becomes a function of $x$. Obviously the effect of this is to cause the proper curve to increase more rapidly with $x$ than the exponential for large values of $x$, but the exact resolution of this question must be left to further mathematical study.

It is perfectly possible to build systems with a continuous distribution of conductance between the interior and exterior of the two. One can be sure that this will produce the most advantageous averaging effect at all frequencies and/or wind velocities.

The exact way in which the continuously distributed conductance considered in theory is concentrated into actual terminations with acoustic resistance in them, may be resolved in the following way. There is no reason for providing a closer spacing of openings than the smallest scale of turbulence which yields disturbances in the wave length bands under consideration. Thus, in the illustration of FIG. 1 the interval between openings should be of the order of 10 cm. It clear that this spacing would be unduly close for the turbulence of one meter scale at the lower frequency end of the range, but it would do no harm at this lower frequency. In some cases it has proven advantageous to use a closer spacing near the transducer and larger spacing further out, nevertheless keeping the average conductance per unit length in accord with the values otherwise determined as from the graph of FIGURE 4.

Figure 5:
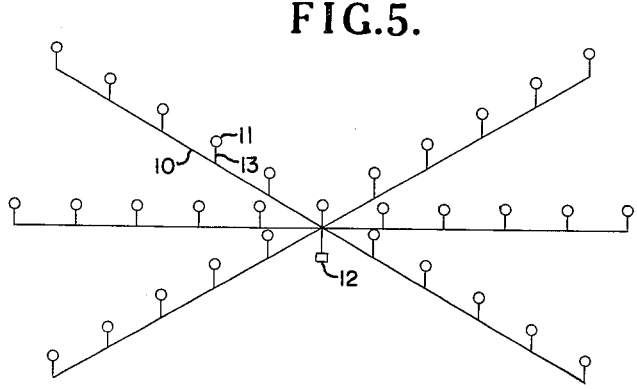
FIG. 5 is a modified directional form of the present invention.

Another modification of the system which has proven advantageous is shown in FIGURE 5. By employing a number of pipes making a relatively small angle with the direction of propagation, it is possible to secure a better averaging-out of turbulence.

In any case, but in particular in those associated with FIGURE 5, it may be that the velocity of propagation in the surrounding medium may exceed the velocity of propagation V within the isolated system too much for effective design. In such cases the velocity V may be increased by filling the tube in which this condition occurs with gases other than air. To secure precisely the correct velocity V it may be desirable to mix air with hydrogen or helium, for instance. Either air or the lighter gases may be employed in the viscous resistances, depending upon the exact design. The mixture of the gases inside the tube with pure air can be avoided by elastic membranes 22, illustrated in FIG. 7, which are so chosen that at the frequency under consideration their impedance is small compared with that of the resistances.

It is obvious that this system will eliminate any noise which is incoherent with respect to the receiving structure. Hence the system tends to overcome ambient noise due, for instance to wind blowing upon the receiving structure.

Structures of the same type have relevance in the transmission of sound in cases where it is desired to overcome the effects of turbulence upon transmission. In this case the transducer is driven by an electrical current and ejects sound into the system. If it is desired that the transmission of sound be uni-directional, the structure will need to be appropriately altered.

In the spacing of the coupling units the greatest attenuation of the noise will be obtained between those units which are spaced apart by a distance greater than the diameter of the largest disturbance it is desired to eliminate. Over all, the value of the noise level in the array will be proportional to $1/\sqrt{n}$ where $n$ is the number of the coupling units.

Consider now some specific examples of the present invention. The array shown in FIG. 1 comprises a plurality of sections of rigid pipe 10 connected to form a continuous enclosed space which contains an acoustical transmitting medium, such as air. At spaced intervals along the sections of pipe, coupling units 11 are provided for introducing the acoustical motions into the medium enclosed in the array. These coupling units 11 are mounted on short pipes 13 connected to the main array. We may suppose, for example, it is desired to received a band of frequencies between 3.4 cycles per second and 34 cycles per second where the velocity of sound in the medium is about 340 meters per second and the velocity of the medium surrounding the array is about 3.4 meters per second. These velocities are normal for air. In this case the wave lengths are 10 to 100 meters, and the turbulence sizes, 1/10 to 1 meter. In the arrays of FIGS. 1 and 2 the length of the array from the transducer 12 is limited to one-fourth the maximum wave length. Therefore the length in the above example will be of the order of 25 meters. The diameter of the pipes in the array is sufficiently small to restrict the development of turbulences within the closed system which would interfere with the reception of the highest frequency of the desired signal. In the example the pipes were of the order of 1½ to 3 inches in diameter. The modification shown in FIG. 2 is an array arranged in radial form on which the coupling units or terminations 11 are mounted. The arrangement is otherwise the same as the structure of FIG. 1. It has the advantage over that of FIG. 1 in having a smaller phase interference in the array.

Figure 3:
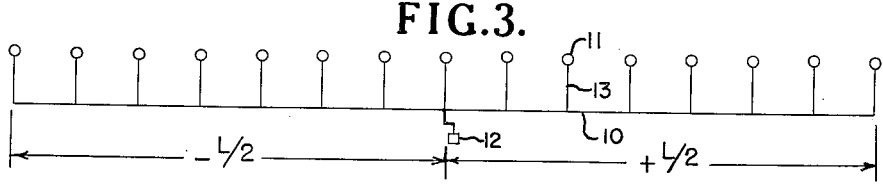
FIG. 3 is a diagram of a further modified form of the invention having directional characteristics.

In FIG. 3 there is shown an embodiment of this invention in which the array consists of two sections of pipe of equal diameter and length joined end to end with a transducer 12 at the junction. Such an arrangement has a definite directional property.

A resistive termination of preferred design is shown in FIG. 6. This resistive coupling consists of a donut shaped member 15 having the central opening threaded for attachment to the short pipe 13 which supports the termination. A disc shaped member 16 is mounted on the member 15 by bolts 17. Sandwiched between the members 15 and 16 is a ring 18 of material having a high viscous damping effect on the movement of pressure waves through it, such as fiber glass. The amount of the resistance in the coupling device or termination can be varied by varying the pressure exerted by the bolts 17. This permits the conductance to be adjusted according to the principles discussed in connection with FIG. 4.

The configuration of the coupling should be streamlined as shown to avoid as much as possible the creation of turbulence by the couping itself. Also it is sometimes desirable to provide a streamlined weather cover 19 as shown in FIG. 1 carried on support 21.

It is to be understood that the invention is not limited to the specific embodiments herein illustrated and described but may be used in other embodiments without departing from the spirit of it as defined in the following claims.

What is claimed as new and desired to be secured by Letters Patent of the United States is:

1. An acoustical discrimination system for detecting an acoustic signal in a sound transmitting medium in the presence of noise produced by turbulences in said transmitting medium, said discrimination system comprising; an acoustical array having at least one pipe, an acoustical transmitting medium within said array, a plurality of terminations connected to said array in mutually spaced relationship for coupling portions of the signal to be received and the turbulence outside said array to said acoustical transmitting medium within said array, the spacing of adjacent terminations being greater than the diameter of the turbulence, said terminations each including means to separate said acoustical transmitting medium within said array from the sound transmitting medium, said means including an element having a predominant component of conductance compared to the component of susceptance therethrough at the frequency of the signal to be received, and a transducer coupled to said array.

2. The acoustical discrimination system of claim 1 wherein each of said elements has a viscous damping effect on the movement of pressure waves therethrough.

3. The acoustical discrimination system of claim 1 wherein said means included in each of said terminations comprises an assembly of a first annular member, a disc-shaped member and said element included in said means is a second annular member of a material having a viscous damping effect on the movement of pressure waves therethrough, said second annular member being clamped between said first annular member and said disc-shaped member, and means attaching said assembly to said array such that said second annular member forms the coupling element between said acoustic transmitting medium within said array and the surrounding medium.

4. A system as claimed in claim 3 in which said assembly is shaped to a smooth and symmetrically contoured exterior surface to reduce to a minimum pressure differentials produced across the termination.

5. A system as claimed in claim 4 in which said assembly includes means for varying the pressure applied to said second annular member.

6. A system as claimed in claim 1 in which said acoustical transmitting medium comprises a fluid having a velocity of propagation different from the velocity of propagation in said external medium for compensating for frictional components affecting the velocity of propagation within said system.

7. The system of claim 1 wherein said array comprises an elongated pipe having said transducer located between the ends thereof, said terminations extending along said pipe, and the conductance of each element increasing from said transducer toward the end of said pipe.

8. The system of claim 1 wherein said array comprises a plurality of interconnected pipes arranged at substantially right angles to each other.

9. The system of claim 1 wherein said array comprises a plurality of elongated interconnected pipes, one end of each of said pipes extending radially from the center of said array, said transducer being connected to the center of said array, one of said terminations mounted at the center of said array, and separate terminations respectively mounted on the other end of each of said pipes.

10. The system of claim 9 further including a plurality of terminations mounted on each of said pipes between said one end and the other ends thereof.

References Cited in the file of this patent

UNITED STATES PATENTS

| | | |
|---|---|---|
| 1,422,876 | Mason | July 18, 1922 |
| 1,547,740 | Fessenden | July 28, 1925 |
| 1,733,718 | Blondel | Oct. 29, 1929 |
| 2,172,871 | Giannini | Sept. 12, 1939 |
| 2,210,415 | Kellogg | Aug. 6, 1940 |
| 2,225,312 | Mason | Dec. 17, 1940 |
| 2,262,146 | Massa | Nov. 11, 1941 |
| 2,299,620 | Giannini | Oct. 20, 1942 |
| 2,463,762 | Giannini | Mar. 8, 1949 |
| 2,524,393 | Lybarger | Oct. 3, 1950 |
| 2,739,659 | Daniels | Mar. 27, 1956 |